United States Patent [19]

Saurwein

[11] Patent Number: 4,973,026
[45] Date of Patent: Nov. 27, 1990

[54] HIGH PRESSURE WATER JET CUTTING NOZZLE ON-OFF VALVE

[76] Inventor: Albert C. Saurwein, 5 F St., SE., Auburn, Wash. 98002

[21] Appl. No.: 226,874

[22] Filed: Aug. 1, 1988

[51] Int. Cl.$^5$ ............................................. F16K 31/143
[52] U.S. Cl. ..................................... 251/63.5; 239/583
[58] Field of Search .................... 251/63.5, 63; 239/583

[56] References Cited

U.S. PATENT DOCUMENTS

| 2,457,993 | 1/1949 | Fletcher et al. | 239/583 |
| 3,270,500 | 9/1966 | Williams | 251/63 |
| 3,394,890 | 7/1968 | Heinrich et al. | 239/583 |

Primary Examiner—A. Michael Chambers
Attorney, Agent, or Firm—Harry M. Cross, Jr.

[57] ABSTRACT

An 2-way on/off high pressure water jet cutting valve is provided with a valve stem designed to close under the influence of high pressure inlet water, an a hydraulic piston designed to open the valve stem against the force exerted by high pressure inlet water. The valve stem extends through the hydraulic piston. The valve stem and the hydraulic piston are contained within the valve housing. Externally applied forces are not required to operate the valve or to insure that the valve operates properly under the influence of the various fluid pressures that are applied to it.

7 Claims, 1 Drawing Sheet

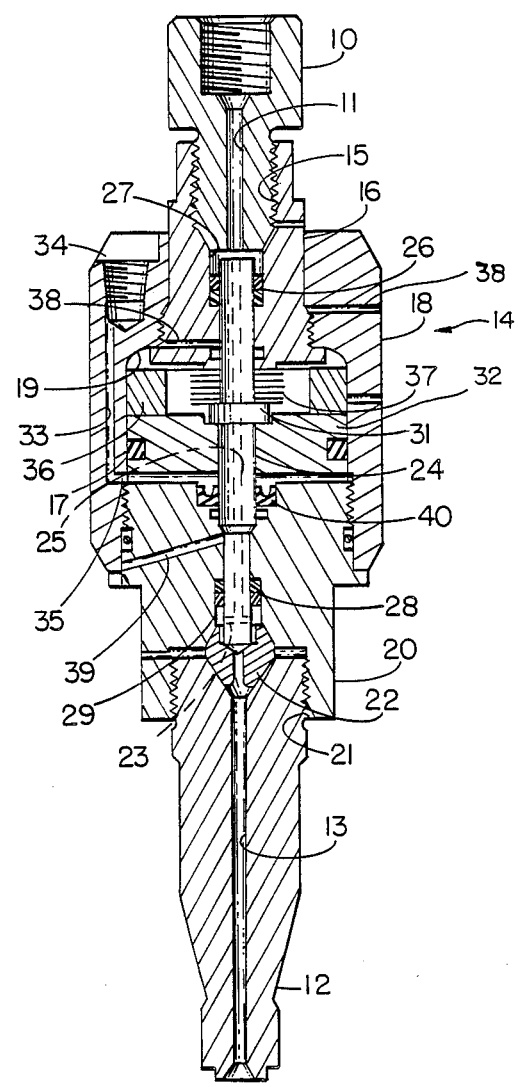

HIGH PRESSURE WATER JET CUTTING NOZZLE ON-OFF VALVE

FIELD OF THE INVENTION

This invention pertains to high pressure water jet cutting devices and more particularly to devices for controlling high pressure water flow from an intensifier to a water jet cutting nozzle.

BACKGROUND OF THE INVENTION

High pressure water jet cutting is accomplished using water pressures of several thousand psi. In a typical water jet cutting system, tap water is pressurized in a double-acting pumping system, stored in a high pressure accumulator wherein the compressed water pressure is stabilized, and withdrawn from the intensifier system through a water jet nozzle. Between the intensifier and the jet nozzle, a valve is usually required to open and close the flow of pressurized water to the jet nozzle. Without such a valve, the entire intensifier system must be shut down to stop water outflow; a major inconvenience.

Among the on-off valve designs proposed by the prior art, a common design has incorporated a hydraulic or pneumatic circuit into the water jet nozzle on-off valve which closes the valve by application of pressurized fluid and opens the valve by release of hydraulic fluid pressure from the valve, allowing the pressurized water itself to force the valve stem open. This design is a simple and straight forward solution but poses safety problems. If, in such a design, fluid pressure is lost when it is intended that the valve remain closed, the sudden opening of the valve as a result of lost hydraulic fluid pressure could be dangerous. Likewise, if the valve is closed and then the system is turned off, even though intentionally, because hydraulic fluid pressure will decay more rapidly than that of the hight pressure water system, at some intermediate pressure the valve will open unexpectedly; again posing a possible hazzard to an operator.

Because of the above delineated problems, it has been posed that hydraulic or pneumatic fluid under pressure ought to be instead directed to open the on-off valve, rather than close it. In such a design, some external force must be applied to close the valve after venting the hydraulic fluid. In such a design, the external force must be sufficiently large to overcome the opening force exerted by the high pressure water present in the valve which works against the valve stem. The solutions to this have included the use of large, bulky Belleville springs, resulting in cumbersome and heavy valve mechanisms.

SUMMARY OF THE INVENTION

The water jet nozzle on-off valve of the present invention is designed to open by the application of pressurized hydraulic fluid, and is designed to close by the application of pressurized water. The valve incorporates a valve stem so designed that pressurized hydraulic fluid can act against a mid-portion of the valve stem to open the valve, and that pressurized water from the intensifier system can act against an end portion of the valve stem to close the valve when the hydraulic fluid is vented from the valve. The resulting on-off valve is compact and relatively light weight because externally-applied forces are not required to operate the valve or to insure that the valve operates properly under the influence of the various fluid pressures that are applied to it.

BRIEF DESCRIPTION OF THE DRAWINGS

The FIGURE is a elevation view of the on-off valve in cross section.

DETAILED DESCRIPTION OF THE INVENTION

The on-off valve of this invention is designed to be attached at one end to the high pressure water outlet from a high pressure water intensifier system and attached at its other end to a water jet cutting nozzle. The valve comprises a high pressure water line adapter 10, a water jet cutting nozzle adapter 12, and the valve mechanism 14 itself. The valve mechanism housing comprises an upper housing 16 which is threaded onto the line adapter fitting 10, a valve cylinder housing 18 into which the upper housing 16 is threaded, and a lower housing 20 which is threaded into cylinder housing and onto the nozzle adapter 12. These elements are axially aligned as shown. The line adapter 10 is bored to provide an axial high pressure water passage 11, and is counter-bored to receive a standard high pressure water line fitting. The nozzle adapter 12 is bored to provide an axial high pressure water passage 13 and is counter-bored at its upper end to receive a machined valve seat 22. The line adapter 10 and the upper housing 16 are cooperatively threaded at 15 for the adapter to be screwed into the upper housing as shown. The nozzle adapter 12 and the lower housing 20 are cooperatively threaded at 21 for the adapter to be screwed into the lower housing as shown.

The valve mechanism includes a stem 24 that extends axially through the housing. The upper housing 16 is bored to receive the upper portion of the stem 24 and is counter-bored at its mid-section to receive a high pressure seal set 26, the latter forming a high pressure water seal between the line adapter 10 and a bleed hole 38 in the upper housing 16. The upper housing is further counter-bored in its outer end portion to receive the line adapter. The lower housing 20 is bored to receive the lower portion of the stem 24 and is counter-bored at is mid-section to receive a high pressure water seal set 28, the latter forming a high pressure water seal between the nozzle adapter and a bleed hole 39 in the lower housing 20. The lower housing is further counter-bored to receive the upper end of valve seat 22 and to receive the nozzle adapter. The upper end of the lower housing 20 is counter-bored to receive a cup seal 40. The stem 24 extends through the upper and lower seal sets, 26 and 28, and the cup seal 30. Upper seal set 26 seats at the bottom of its counter-bore 27 and lower seal set 28 seats at the top of its counter-bore 29. Stem 24 is axially bored through its entire length, except for its lower end portion, to provide a high pressure water passage 25 that communicates with adapter passage 11 through the upper region of the upper seal set counter-bore 27. The lower end portion of stem 24 is cross-bored to provide high pressure water passages 23 communicating with axial passage 25 and the lower region of the lower seal set counter-bore 29.

The cylinder housing 18 joins the upper and lower housings, 16 and 20, and provides a cylindrical hydraulic piston cavity 19. A hydraulic piston 32, axially bored to receive stem 24, is provided in the form of a circular disk peripherally sealed against the outer surface of cavity 19 by a ring seal 17. Piston 32 abuts the top of lower housing 20 on one side, and abuts a shoulder 31 on stem 24 on its other side. Shoulder 31 is integral with stem 24 and fits within a counter-bored pocket in the upper side of piston 32 as shown. A series of small Bellville springs 37 are fitted around stem 24 and reside between the upper face of shoulder 31 and the bottom of upper housing 16. An annular collar 36 is positioned within cavity 19 between the upper face of piston 32 and the bottom of upper housing 16. The gap between the bottom of collar 36 and the top of lower housing 20 is a fraction of an inch greater than the thickness of piston 32; about 15 thousandths of an inch greater. Cylindrical housing 18 is provided with an excentric longitudinal bore 33 that communicates at its upper end with a counter-bore 34 for a hydraulic fluid fitting and at its bottom end with a diametral bore 35 into cavity 19 below piston 32.

Valve stem 24 reciprocates within the valve mechanism from a closed postion, as shown in the FIGURE, with its bottom end seated against valve seat 22 to an open position. At its open position, its bottom end is retracted upward away from the valve seat 22, and its upper end contacts the bottom of water adapter 10, limiting the amount of upward travel possible. To open the valve mechanism by lifting the stem 24, pressurized hydraulic fluid through bores 33, 34, 35 exerts an upward force on the underside of piston 32, whereby piston 32 engages the stem shoulder 31. As piston 32 travels upward until contact with the collar 36 it carries stem 24 with it, raising stem away from sealing contact with valve seat 22. As stem 24 raises off its seat 22, high pressure water will flow through the valve stem and into nozzle adapter 12. The underside area of piston 32 is sufficient to create a great enough force to overcome the force of the high pressure water acting against the top of stem 24, maintaining to keep the stem in sealing contact with seat 22. When the hydraulic fluid pressure is vented, the high pressure water in water adapter 10 will exert sufficient pressure to drive the stem 24 back down into sealing contact with seat 22. The top of stem 24 has an area sufficiently greater than the area of the stem bottom end such that the force of the high pressure water, acting on the stem top, will overcome the frictional force of the two seal sets and the pressure of the water within the counter bore 29.

If the intensifier is shut down, so that the pressure from the high pressure water source reduces to tap water pressure, any residual vented (tank) pressure of the hydraulic fluid acting against the underside of piston 32 might tend to overcome the tap water pressure acting against the top of stem 24. If this occurred, the valve mechanism would drip. To counteract any such tendency to leak or drip, a stack of small Bellville springs 37, acting between the stem shoulder 31 and the bottom of upper housing 16 will force the stem into sealing engagement with seat 22.

The valve housing members are axially arranged as shown in the FIGURE and threadedly engaged such that the high pressure seal sets 26 and 28 can be easily accessed for servicing. The upper seal set 26 will be exposed when the water adapter 10 is unthreaded from the upper housing 16. The lower seal set 28 will be exposed when the nozzle adapter 12 is unthreaded from the lower housing 20. Likewise, unthreading the nozzle adapter from the lower housing 20 will expose the valve seat 22 for servicing. If more major servicing must be performed, the lower housing 20 may be unthreaded from the cylindrical housing 18 to expose the piston 32 and the valve stem 24, as well as the cup seal 30.

While the preferred embodiment of the invention has been described herein, variations in the design may be made. For example, the utility of the valve design described herein is not limited to control of water jet cutting water flow. This valve design could be employed in any high pressure 2-way valve application. In particular, the valve could be employed where pneumatic actuation is desired in substitution for hydraulic actuation. The scope of the invention, therefore, is only to be limited by the claims appended hereto.

The embodiments of the invention in which an exclusive property is claimed are defined as follows:

1. A high pressure water on/off valve which comprises a valve housing having a piston cavity therein and a high pressure water inlet at one end and a high pressure water outlet at its other end; a valve closure seat member positioned at said other end of said valve housing and having a bore therein communicating with said valve high pressure water outlet; a valve stem extending longitudinally through said valve housing and having a high pressure water passage extending therein in communication with said high pressure water inlet and outlet, said valve stem having one end of a relatively larger area exposed to said high pressure water inlet and having another end of a relatively smaller area designed to contact said valve seat member to seal off said high pressure water outlet; an inlet seal set engaging said valve housing and said valve stem to seal off said high pressure water inlet from said piston cavity; an outlet seal set engaging said valve housing and said valve stem to seal off said high pressure water outler from said piston cavity; a piston located within said piston cavity for reciprocable movement therein, said valve stem extending through said piston whereby a portion of said valve stem may be contacted by said piston to lift said valve stem away from sealing engagement with said valve seat, said valve housing being ported to permit pressurized fluid to exert sufficient pressure on said piston to overcome the force of high pressure water acting on the valve stem end of relatively larger area whereby said piston will lift said valve stem from said valve seat to enable high pressure water to flow through said valve from said high pressure water inlet through said valve stem to said high pressure water outlet.

2. A high pressure water on/off valve which comprises a valve housing having a piston cavity therein and a high pressure water inlet at one end and a high pressure water outlet at its other end; a valve closure seat member positioned at said other end of said valve housing and having a bore therein communicating with said valve high pressure water outlet; a valve stem extending longitudinally through said valve housing and having a high pressure water passage extending therein in communication with said high pressure water inlet and outlet, said valve stem having one end of a relatively larger area exposed to said high pressure water inlet and having another end of a relatively smaller area designed to contact said valve seat member to seal off said high pressure water outlet; an inlet seal set engaging said valve housing and said valve stem to seal off said high pressure water inlet from said piston cavity; an outlet seal set engaging said valve housing and said valve stem to seal off said high pressure water outler from said piston cavity; a piston located within said piston cavity for reciprocable movement therein, said valve stem extending through said piston whereby a portion of said valve stem may be contacted by said piston to lift said valve stem away from sealing engagement with said valve seat, said valve housing being ported to permit pressurized fluid to exert sufficient pressure on said piston to overcome the force of high pressure water acting on the valve stem end of relatively larger area whereby said piston will lift said valve stem from said valve seat to enable high pressure water to flow through said valve from said high pressure water inlet through said valve stem to said high pressure water outlet; said valve housing being composed of an upper housing member containing said high pressure water inlet, a cylindrical housing member containing said piston cavity, and a lower housing member containing said high pressure water outlet; said valve stem extending from said upper housing member through said cylindrical housing member and into said lower housing member in axial alignment with said high pressure water inlet and outlet; said valve stem being provided with a piston-contacting shoulder adjacent the lower end of said upper housing member, with said piston being positioned between said shoulder and said lower housing member to lift said valve stem from sealing engagement with said valve seat upon the application of pressurized fluid force thereto.

3. The valve of claim 2 including a water adapter member mounted on said upper housing member and having a water passage communicating with said high pressure water inlet; and including a nozzle adapter mounted on said lower housing member and having a water passage therein communicating with said high pressure water outlet.

4. The valve of claim 3 wherein said water adapter is threaded into said upper housing member, said upper housing member is threaded into said cylindrical housing, said lower housing is threaded into said cylindrical housing, and said nozzle adapter is threaded into said lower housing; and wherein the aforesaid member are so arranged that said water adapter may be unthreaded to expose the upper end of said valve stem, and that said nozzle adapter may be unthreaded to expose said valve seat and the lower end of said valve stem.

5. The valve of claim 4 wherein said inlet seal set is positioned in said upper housing member adjacent to said water adapter whereby said inlet seal set is accessible upon disengagement of said water adapter; and said outlet seal set is positioned in said lower housing member adjacent to said nozzle adapter whereby said outlet seal set is accessible upon disengagement of said nozzle adapter.

6. The valve of claim 2 wherein said cylindrical housing member is provided with a fluid passage opening into said piston cavity adjacent the inner end of said lower housing member to supply pressurized fluid to move said piston and valve stem.

7. The valve of claim 2 wherein said inlet seal set is positioned in said upper housing member and said outlet seal set is positioned in said lower housing member.

* * * * *